United States Patent
Bayazit (10) Patent No.: US 7,272,181 B2
(45) Date of Patent: Sep. 18, 2007

(54) METHOD AND APPARATUS FOR ESTIMATING AND CONTROLLING THE NUMBER OF BITS OUTPUT FROM A VIDEO CODER

(75) Inventor: Ulug Bayazit, Sunnyvale, CA (US)

(73) Assignee: Toshiba America Electronic Components, Inc., San Jose, CA (US)

( * ) Notice: Subject to any disclaimer, the term of this patent is extended or adjusted under 35 U.S.C. 154(b) by 722 days.

(21) Appl. No.: 10/618,344

(22) Filed: Jul. 10, 2003

(65) Prior Publication Data
US 2004/0105491 A1 Jun. 3, 2004

Related U.S. Application Data

(62) Division of application No. 09/425,274, filed on Oct. 21, 1999, now Pat. No. 6,639,942.

(51) Int. Cl.
H04B 1/66 (2006.01)
(52) U.S. Cl. .................................. 375/240.01
(58) Field of Classification Search ........... 375/240.01, 375/240.12, 240.21, 240.26; H04B 1/66
See application file for complete search history.

(56) References Cited

U.S. PATENT DOCUMENTS 5,291,282 A    3/1994  Nakagawa et al.
6,081,781 A    6/2000  Tanaka et al.
6,144,763 A    11/2000 Ito
6,535,556 B1 * 3/2003  Kato et al. ............. 375/240.05

* cited by examiner

Primary Examiner—Tung Vo
(74) Attorney, Agent, or Firm—DLA Piper U.S. LLP (57) ABSTRACT

A method and apparatus is provided for estimating the number of bits output from a video coder given a known spatial data content, $G=\{g_1, \ldots, g_N\}$, of a group of luminance and chrominance blocks, and a known coding mode, d, where d represents the index of said coding mode. The method comprises the steps of extracting a significant part of the spatial data content, G, in relation to the coding mode, d, to yield a feature vector F, the feature vector representing statistics and signal components of the luminance and chrominance data of the luminance and chrominance blocks; mapping the feature vector to yield a class index, c, for said respective group of luminance and chrominance blocks; mapping the class index, c, in relation to a quantization parameter, q, where the quantization parameter controls the scale of the bin size of the quantizer applied to the transform coefficients, to yield an estimated number of quantization bits for the group of luminance and chrominance blocks; and determining an estimated total number of coding bits for the group of luminance and chrominance blocks from the combination of the estimated number of quantization bits and an estimated number of overhead bits, wherein the overhead bits represent the additional bits expended to represent respective portions of the bitstream.

20 Claims, 5 Drawing Sheets

METHOD AND APPARATUS FOR ESTIMATING AND CONTROLLING THE NUMBER OF BITS OUTPUT FROM A VIDEO CODER

CROSS-REFERENCE TO RELATED APPLICATION

This application is a divisional application and claims the benefit of U.S. patent application Ser. No. 09/425,274 filed on Oct. 21, 1999, now U.S. Pat. No. 6,639,942 the disclosure of which is incorporated herein by reference.

BACKGROUND OF THE INVENTION

1. Field of the Invention

The present invention relates to signal processing, and in particular, to a method and apparatus for estimating and controlling the number of bits output from a video coder.

2. Description of the Related Art

Numerous international video coding standards have been established over the last decade. MPEG-1, for example, defines a bitstream for compressed video and audio optimized to fit into a bandwidth of 1.5 Mbits/sec. This rate is special because it is the data rate of uncompressed audio CDs and DATs.

MPEG-1 is defined to begin with a relatively low-resolution video sequence of about 352×240 frames×30 frames/sec., but use original high (CD) quality audio. The images are in color, but are converted into YUV space (a color space represented by luminance (Y) and two color differences (U and V)).

The basic scheme of MPEG-1 is to predict motion from frame-to-frame in the temporal direction, and then to use discrete cosine transforms (DCTs) to organize the redundancy in the spatial directions. The DCTs are performed on 8×8 blocks, and the motion prediction is done in the luminance channel (Y) on 16×16 blocks (each of the 16×16 Y and the corresponding 8×8 U and V block pairs is considered to be a macroblock).

In other words, given the 16×16 block in a current frame to be coded, a close match to that block in a previous or future frame (there are backward prediction modes where later frames are sent first to allow interpolating between frames) is desired.

The DCT coefficients of either the actual data, or the difference between the block and the close match, are "quantized," in that they are coarsely represented by fewer number of bits by means of (shifting and) integer dividing by a quantization parameter to yield quantization levels. By quantization, it is desired that many of these DCT coefficients will become "0" and drop out.

The result of the coding, including the motion vectors and the quantization levels are variable length coded using fixed tables. The quantization levels are zigzag scanned and ordered into a one—dimensional array. Each nonzero level is represented by a codeword indicating a run—length of zeros preceding in the scan order, the nonzero value of the level that ended the run and whether more nonzero levels are to be coded in the block. Compression is achieved by assigning shorter codewords to frequent events and longer codewords to less frequent events.

In the MPEG standard, there are three types of coded frames. There are "I" frames, or intra-coded frames, that are simply a frame coded as a still image, without using any past history. Then there are "P" frames, or predicted frames. P-frames are predicted from the most recently reconstructed I- or P-frame (from the point of view of the decompressor). Further, each macroblock in a P-frame can either be characterized by a motion vector from a close match in the last I or P-frame and blocks of DCT coefficients of the motion compensated difference values associated with the motion vector (inter coded), or simply be characterized by the blocks of DCT coefficients of the macroblock itself (intra-coded), if no suitable match exists.

In "B" (bidirectional) frames matching blocks are searched for in the past and/or future I or Pframes. The macroblock can be motion compensated by only the forward vector and using DCT blocks from the past frames, or by only the backward vector and using DCT blocks from the future frames or by both forward and backward vectors and using the average of the DCT blocks from past and future frames. The macroblock can also be simply intra-coded. Thus, after coding, a typical frame sequence may resemble the following sequence: IBBPBBPBBPBBIBBPBBPB . . . , where there are 12 frames from I to I.

Unlike MPEG-1, that is strictly meant for progressive sequences, another standard, MPEG-2 was developed. MPEG-2 can represent interlaced or progressive video sequences. The MPEG-2 concept is similar to MPEG-1, but included extensions to cover a wider range of applications. The primary application targeted by MPEG-2 is the all-digital transmission of broadcast television quality video at coded bit rates between 4 and 9 Mbit/sec. The most significant enhancement in MPEG-2 is the addition of syntax for efficient coding of interlaced video (16×8 block size motion compensation).

Several other enhancements such as alternate scan, intra VLC, nonuniform quantization resulted in improved coding efficiency for MPEG-2. Other key features of MPEG-2 are the scalable extensions that permitted the division of a continuous video signal into two or more coded bit streams representing the video at different resolutions, picture quality or picture rates.

H.261 is a video coding standard designed for data rates that are multiples of 64 Kbit/sec. This standard is specifically designed to suit ISDN lines.

As in MPEG standards the coding algorithm utilized is a hybrid of inter-picture prediction, transform coding and motion compensation. The data rate of the coding algorithm can be set between 40 Kbit/sec. and 2 Mbit/sec. Inter-picture prediction aids in the removal of temporal redundancy, while transform coding removes spatial redundancy and motion vectors are used to help the codec compensate for motion. To remove any further redundancy in the bitstream, variable length coding is utilized.

As in the MPEG standards, H.261 allows the DCT coefficients to be either intra coded or inter coded from previous frames. In other words the 8×8 blocks of DCT coefficients of the actual data or the motion compensated difference values are quantized and variable length coded. They are multiplexed onto a hierarchical bitstream along with the variable length coded motion vectors.

A similar standard, H.263, is a compression standard originally designed for low bit rate communication, but can use a wide range of bit rates. The coding algorithm is similar to that of H.261, but improves H.261 in certain areas. Specifically, half-pixel precision is used for motion compensation, as opposed to full pixel precision and a loop filter used by H.261. Additionally, H.263 includes unrestricted motion vectors, syntax-based arithmetic coding, advance prediction and forward and backward frame prediction similar to MPEG, called P-B frames. This results in the ability to achieve the same video quality as in H.261 at a drastically lower bit rate.

Unrestricted motion vectors point outside the picture. That is, the edge pixels are used as predictions for the "not existing" pixels. There is a significant gain achieved if there is movement along the edge of the picture.

Through advance prediction, overlapped block motion compensation is used for the P-frames. That is, four 8×8 vectors, instead of one 16×16 vector are used for some of the macroblocks in the picture, and motion vectors are allowed to point outside the picture. Four vectors require more bits, but give better prediction.

A "P-B" frame consists of two pictures being coded as one unit. The name P-B actually was derived from the name of picture types in MPEG (P-frames and B-frames). Thus, a P-B-frame consists of one P-frame that is predicted from the last decoded P-frame and one B-frame that is predicted from both the last decoded P-frame and the P-frame currently being decoded. The last picture is called a B-picture because parts of it may be bi-directionally predicted from the past and future P-frames.

As a result of the above characteristics, for relatively simple sequences, the frame rate can be doubled with this mode without greatly increasing the bit rate. For sequences with a lot of motion, P-B-frames do not work as well as B-frames in MPEG, since there are no separate forward and backward vectors in H.263. A motion vector for the P-frame is scaled to yield the backward vector for the B frame and scaled and augmented by a delta vector to yield the forward vector for the B frame.

Another compression standard is MPEG-4. From a video compression perspective, MPEG-4 is closely related to H.263 and MPEG-1. MPEG-4 video compression uses the hybrid block DCT and motion compensation video coding techniques found in MPEG-1, MPEG-2, H.261 and H.263. As in MPEG and H.263, the DCT is used in transform coding of the macroblock or the motion compensated prediction error (the displaced frame difference, or DFD) of the macroblock. Each of the I, P and P-B frames are supported.

Additionally, as in H.263, unrestricted motion vectors, syntax based arithmetic coding, advance prediction with 8×8 pixel block-based, overlapped motion compensation. DCT transforms are quantized, run-length encoded and variable-length coded using the same tables as H.263 and MPEG-1.

The major improvement in MPEG-4 did not lie in the video compression algorithm, but instead was in support of multiple video layers in the image sequence (instances of which in a frame are Video Object Planes, or VOPs). For example, one VOP could be a speaker, such as a newscaster, in the foreground, and another VOP could be a static background, such as a news studio. These VOPs could be coded separately including shape and transparency information. Since a VOP can be a rectangular plane, such as a single monolithic frame in MPEG-1, or have an arbitrary shape, this allows for separate encoding, decoding, and manipulation of various visual objects that make up a scene.

Typically, under these international video coding standards, a single quantization parameter q controls the scale of the quantizer bin size, which is proportional to the difference between the decision levels of the scalar quantizer applied to each DCT coefficient. The spatial data content of a group of one or more luminance or chrominance blocks along with the coding mode and the quantization parameter for the group determine the number of bits that are expended for the quantization of the group. In turn, the number of quantization bits, combined with the number of overhead bits expended for the representation of the motion vectors, coding modes, coding block patterns of the blocks and the quantization parameter yields the total number of bits used for coding of that group.

In the early reference rate control methods developed for MPEG-2 and H.263, the error between the cumulative actual and cumulative targeted number of coding bits is computed for the previously coded data entities (a single macroblock, a group of macroblocks, and pictures). This error is negatively fed back to the most recent quantization parameter to determine the quantization parameter for the current data entity. Thus, the error between the actual and targeted number of coding bits for the current data entity has no effect on the selection process for the quantization parameter for the current data entity. The delay in the response time to the errors results in large deviations from targeted rate profiles. Even for constant bit rate applications, such large deviations usually leads to large buffer requirements.

More recent rate control methods adopted by MPEG-4 Verification Model and ITU-T Test Model TMN8 achieve more accurate rate control. For example, the rate control method adopted by MPEG-4 estimates the number of coding bits of a data entity for each quantization parameter before the coding process. The quantization parameters associated with an estimate for the number of coding bits that is closest to the targeted number of coding bits (bit budget) for the data entities are selected for the data entities. After the encoding of each data entity the quantization parameters for the remaining data entities are updated such that the estimate for the number of coding bits for the remaining entities closely approximates the remaining bit budget. The relation between the estimate for the number of coding bits for a data entity and the quantization parameter is established by means of a rate-distortion function which incorporates a sample statistic of the data entity. The quantization parameter and the actual number of coding bits observed after coding a data entity with that quantization parameter are used to update the parameters of the rate distortion function by linear regression.

Conventional video coders that operate under one of these compression standards process a sequence of video frames or fields and output a bitstream representing the significant data contained in these frames or fields. A video decoder inputting such a bitstream can reconstruct these frames or fields with a certain fidelity.

Figure 1A:
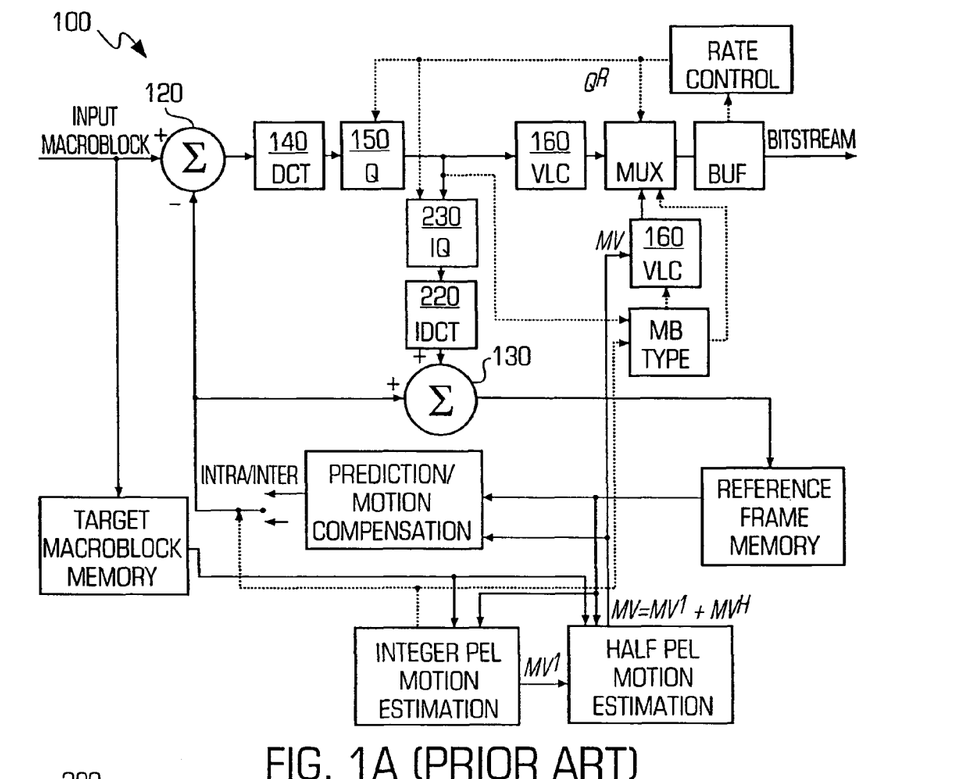
FIG. 1A is a block diagram of a conventional video encoder.
Figure 1B:
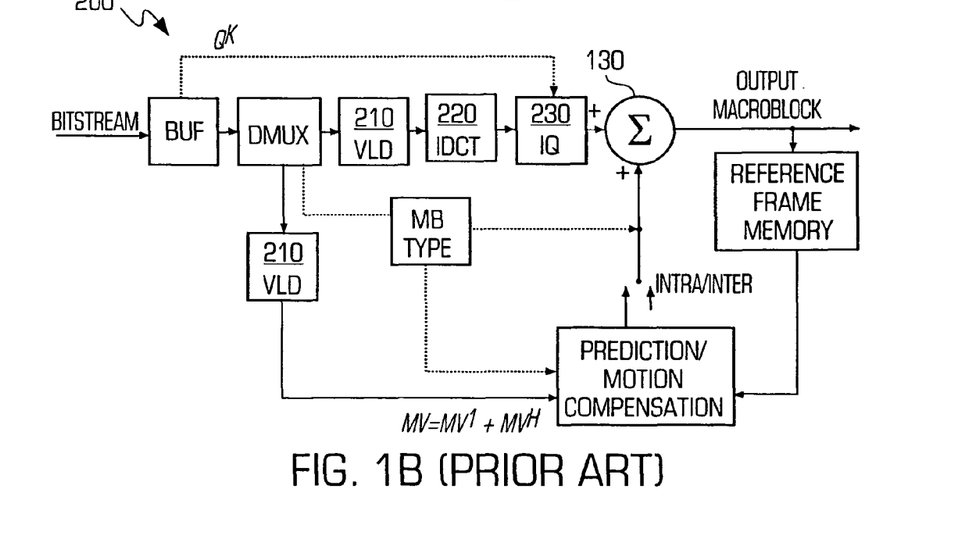
FIG. 1B is a block diagram of a conventional video decoder.

A generic coder/decoder pair 100, 200 is shown in FIGS. 1A and 1B respectively. In general, in operation of the coder 100, a frame or field of data is partitioned into groups of square blocks, herein referred to as macroblocks, of pixel luminance intensity values and corresponding pixel chrominance intensity values.

For each macroblock, one of the intensity values of the pixels, and the error 120, 130 of their temporal prediction from one or more temporally local frames is transformed by means of a two-dimensional orthogonal transform, such as a discrete cosine transform (DCT) 140.

The transform coefficients of the chrominance and luminance blocks of the macroblock are quantized, usually one at a time, with a uniform scalar quantizer (Q) 150. The quantized bits of data of each block are further compressed by a variable length coder (VLC) 160 that maps the quantized bits to a series of codewords of bits by means of a look-up table.

Similarly, in operation of the decoder 200, by means of a look-up table, the quantized bits of data of each block are initially decompressed by a variable length decoder (VLD) 210. Further, an inverse discrete cosine transform (IDCT)

220 and an inverse uniform scalar quantizer (IQ) 230 operate upon these quantized bits of data to reproduce the intensity values of the pixels, and the error of their temporal prediction from one or more temporally local frames with a certain error from their original values.

Due to the significant length of the bitstreams involved in compression/decompression, there is a need for a method that can accurately determine and control the number of bits expected to be expended for the quantization of a future group of blocks.

SUMMARY OF THE INVENTION

The present invention derives a model of the relation between the number of bits used by the quantizer to quantize a group of blocks and the quantization parameter for that group given the spatial data content of the group and the coding mode. The invention uses the model to precisely estimate the number of bits that will be expended for the quantization of a future group of blocks for a chosen quantization parameter, a known spatial data content, and a known coding mode.

However, it is not feasible to precisely model the relation between all possible spatial data content and corresponding number of quantization bits due to the high computational and storage complexity required for the design and storage of such a model. To help avoid this problem, a feature extractor lowers the computational and design complexities by extracting the significant part of the data based on the coding mode. A classifier then acts on the features to yield a class for the group of blocks. A conditional estimator maps the class information and the quantizer parameter to an estimate for the number of quantization bits for the group of blocks. The estimates for the quantization and overhead bits are combined to give an estimate for the number of coding bits of the group of blocks.

This invention facilitates a targeted number of coding bits for a data entity consisting of one or more groups of blocks to be closely approximated. The target number of bits is usually determined by the constraints on transmission bandwidth, latency, and buffer capacity. The estimates for the number of quantization bits of all of the groups of the data entity are combined to yield an estimate for the number of quantization bits for the data entity.

The number of quantization bits for each group decreases monotonically with the quantization parameter for that group. Assuming that the number of overhead bits for the data entity does not increase with the average quantization parameter for the data entity the estimate for the number of coding bits for the data entity also decreases monotonically with the average quantization parameter for the data entity. This allows the system to control number of bits output for the data entity by selecting a combination of quantization parameters which correspond to an estimate for the number of coding bits of the data entity that is closest to the targeted number of coding bits of the data entity.

DETAILED DESCRIPTION OF THE PREFERRED EMBODIMENT

Invention Theory

Figure 2:
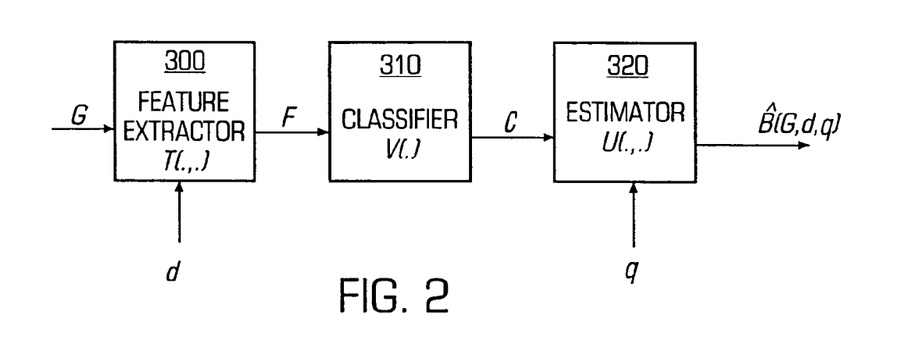
FIG. 2 is a block diagram of a circuit to estimate the number of quantization bits according to an embodiment of the invention.

FIG. 2 shows a high-level functional block diagram of a circuit operating the method according to an embodiment of the present invention. The circuit illustrated in FIG. 2 includes a feature extractor 300, a classifier 310, and an estimator 320.

Still referring to FIG. 2, in operation, $G=\{g_1, \ldots, g_N\}$ denote a group of luminance and chrominance blocks and d denote the index of the coding mode of G. The feature extractor 300 acts on G and d and yields a feature vector $F=T(G, d)$ where T is the feature extraction mapping.

After obtaining the feature vector, the classifier 310 maps the feature vector to to a class index $c=V(F)$ $c \in \{1, \ldots, L\}$ where V is the classification mapping and L is the number of classes. There is no need to specify an upper limit to L.

A final two-to-one mapping is performed on the class index by an estimator 320 that provides the estimate for the number of quantization bits $\hat{B}(G, d, q)=U(c, q)$ for the group of blocks (of transform coefficients) where U is the nonlinear estimation mapping and q is the quantization parameter.

The invention facilitates the design of the feature extractor 300, the classifier 310 and the estimator 320 in such a way that the estimate $\hat{B}(g_1, \ldots, g_N, d, q)$ closely approximates the actual number of quantization bits $B(g_1, \ldots, g_N, d, q)$ in a statistical sense.

The invention is accomplished according to the following statistical determination. Let the cost of estimating $B(g_1, \ldots, g_N, d, q)$ by $\hat{B}(g_1, \ldots, g_N, d, q)$ be represented as $C(B(g_1, \ldots, g_N, d, q), \hat{B}(g_1, \ldots, g_N, d, q))$. Ideally, the mappings T, V and U are designed to minimize the expected cost represented according to the formula:

$$\overline{C}(d,q) = E[C(B(g_1, \ldots, g_N, d, q), \hat{B}(g_1, \ldots, g_N, d, q))]$$
$$= \int C(B(g_1, \ldots, g_N, d, q), \hat{B}(g_1, \ldots, g_1, d, q)) dp(g_1, \ldots, g_N)$$

$g_1, \ldots, g_N$ where E is the statistical expectation of its argument with respect to $\{g_1, \ldots, g_N\}$ and $dp(g_1, \ldots, g_N)$ measures the probability of observing the group of blocks $\{g_1, \ldots, g_N\}$.

The minimization of the above expression for the expected cost generally requires the joint optimal design of the feature extractor 300, the classifier 310, and the estimator 320. However, this is not generally feasible due to the high computational complexity required to perform such a joint optimization.

A sequential design approach involves designing each one of the stages once based on the data supplied to each stage from the preceding stages.

Through this approach, the feature extractor 300, T, is designed with a priori knowledge of the significant part of the data in the group of chrominance and luminance blocks. The mapping also provides the most desired tradeoff between the reduction of the dimensionality of its input space and the preservation of the significant information in the group of blocks. For example, the feature extractor may yield a sample statistic such as sample variance or sample mean absolute value of the data in the group of chrominance and luminance blocks as the one dimensional feature vector. On the other hand, the rate-distortion bounds for Laplacian and Gaussians source which are commonly used for modelling the operational rate-distortion functions for the scalar quantization of DCT coefficients are parameterized by source variance.

The classifier 310, V, is designed so that any output feature vector (obtained from the operation of the feature extractor 300) is in the domain of V and the classification operation does not lead to substantial loss of the extracted significant information (representative of the chrominance and the luminance).

Given these two mappings, the design problem for the estimator 330, U, is the minimization of the following equation:

$$\bar{C}(d, q) = \sum_{c \in \{1, \ldots, L\}} p(c) \int_{\substack{g_1, \ldots, g_N \\ V(T(g_1, \ldots, g_N, d)) = c}} C(B(g_1, \ldots, g_N, d, q), U(c, q)) d p(g_1, \ldots, g_N \mid c)$$

for every possible combination of quantization parameter q and coding mode d.

In another embodiment, the invention will be described in operation with coding for a baseline H.263 compliant bitstream and decoder. The video sequence consists of I and P pictures. I and P pictures are further partitioned into groups of four luminance and two chrominance blocks (macroblocks). A macroblock has 384 luminance and chrominance data elements. The I picture macroblocks are either intra-coded and P picture macroblocks are either intra-coded, inter-coded, or not coded at all. Intra-coding implies that the macroblock is coded without subtracting from it a temporal prediction from the past temporally local frames. Inter-coding implies that the temporal prediction error of the macroblock is coded.

The macroblock type, coded block pattern, and differential quantization parameter between macroblocks are coded and transmitted. Motion vector information is also coded and transmitted for inter-coded macroblocks. The cost function employed in this embodiment is determined as the square difference, given as $C(a, b) = (a-b)^2$.

This embodiment of the invention exemplifies how 1) the three circuits T, V and U (300, 310 and 320 respectively) can be designed sequentially; 2) how an estimate for the number of quantization bits can be obtained for a macroblock (group of blocks); and 3) how a targeted number of coding bits can be approximated for a single picture (data entity).

Feature Extractor

The feature extractor 300 operates according to the following principle. Suppose $G^R = \{g_1^R, \ldots, g_6^R\}$ is the $R^{th}$ macroblock to be coded. Let I(x, y) denote the intensity value at location (x, y) of a coded picture. This could represent a luminance or a chrominance intensity value, or the motion compensated error value thereof, depending on the coding mode of the macroblock.

The coding mode of the macroblock is indicated by the exemplary equation:

$$d^R = \begin{cases} 0 & \text{if inter-coded} \\ 1 & \text{if intra-coded} \end{cases}$$

and is stored as a first feature. The RMS (Root Mean Square) of the non-intra-DC coefficients of the luminance and chrominance blocks of the $R^{th}$ macroblock, $\Phi^R$, is computed according to the following equation:

$$\sigma^R = \left( \frac{1}{384} \sum_{j \in \{1, \ldots, 6\}} \sum_{(x,y) \in g_j^R} (I(x, y) - d^R \bar{I}_j^R)^2 \right)^{1/2}$$

and is stored as a second feature, where the block mean $\bar{I}_j^R$ is defined as:

$$\bar{I}_j^R = \frac{1}{64} \sum_{(x,y) \in g_j^R} I(x, y).$$

Classifier

The classifier 310 employs a simple uniform scalar quantizer with bin size * on $\Phi^R$ to yield a class for the macroblock according to the following:

$$l^R = \begin{cases} \left\lfloor \dfrac{\sigma^R}{\delta} \right\rfloor & \text{if } \sigma^R < l^{\max} \delta \\ l^{\max} & \text{else} \end{cases}$$

$$c^R = V(\sigma^R, d^R) = l^R + d^R(l^{\max} + 1)$$

In general, the quantizer employed in the classifier 310 is different than the quantizer employed in the main coding loop.

Estimator

The estimator 320 employs the expected value of the number of quantization bits conditioned on the class, c, and the quantization parameter, q, as the closest bit count estimate, U(c, q), for a macroblock of class c quantized with quantization parameter q. For the R'th macroblock the estimate is obtained according to the following equation:

$$\hat{B}(g_1^R, \ldots, g_6^R, d^R, q) = U(c^R, q) = E[B(g_1, \ldots, g_6, d, q) \mid V(T(g_1, \ldots, g_6, d)) = c^R]$$

The conditional expected value is further estimated from the previous observations of the number of actual quantization bits by the exemplary equation according to the following:

$$\hat{B}(g_1^R, \ldots, g_6^R, d^R, q) = U(c^R, q) = U^R(c^R, q)$$

-continued $$U^R(c, q) = \frac{1}{P_{c,q}^{R-1}} \sum_{\substack{r: r<R, \\ Q^r=q, \\ V(T(g_1^r, \ldots, g_6^r, d^r))=c}} B(g_1^r, \ldots, g_6^r, d^r, Q^r)$$

where $U^R(c, q)$ is the estimate of number of quantization bits for a macroblock of class c quantized with quantization parameter q prior to R'th macroblock. $P_{c,q}^X$ is the number of macroblocks prior to and including X'th macroblock which are of class c and are coded with parameter q.

The estimate $U^R(c, q)$ changes with the number of coded macroblocks. In order to refrain from repeating the summation when R is large, an update form of the above equation is used that is given by the following:

$$U^R(c,q) = U^{kZ}(c,q) \text{ for } kZ < R \leq (k+1)Z$$

with $$U^{kZ}(c, q) = \begin{cases} \dfrac{P_{c,q}^{(k-1)Z} U^{(k-1)Z}(c, q) + \sum_{\substack{r: (k-1)Z<r\leq kZ, \\ V(T(g_1^r, \ldots, g_6^r, d^r))=c \\ Q^r=q}} B(g_1^r, \ldots, g_6^r, d^r, Q^r)}{P_{c,q}^{kZ}} & \text{if } P_{c,q}^{kZ} > P_{c,q}^{(k-1)Z} \\ U^{(k-1)Z}(c, q) & \text{else} \end{cases}$$

where the update term in the second recursive equation is a sum over $P_{c,q}^{kZ} - P_{c,q}^{(k-1)Z}$ macroblocks.

Figure 3:
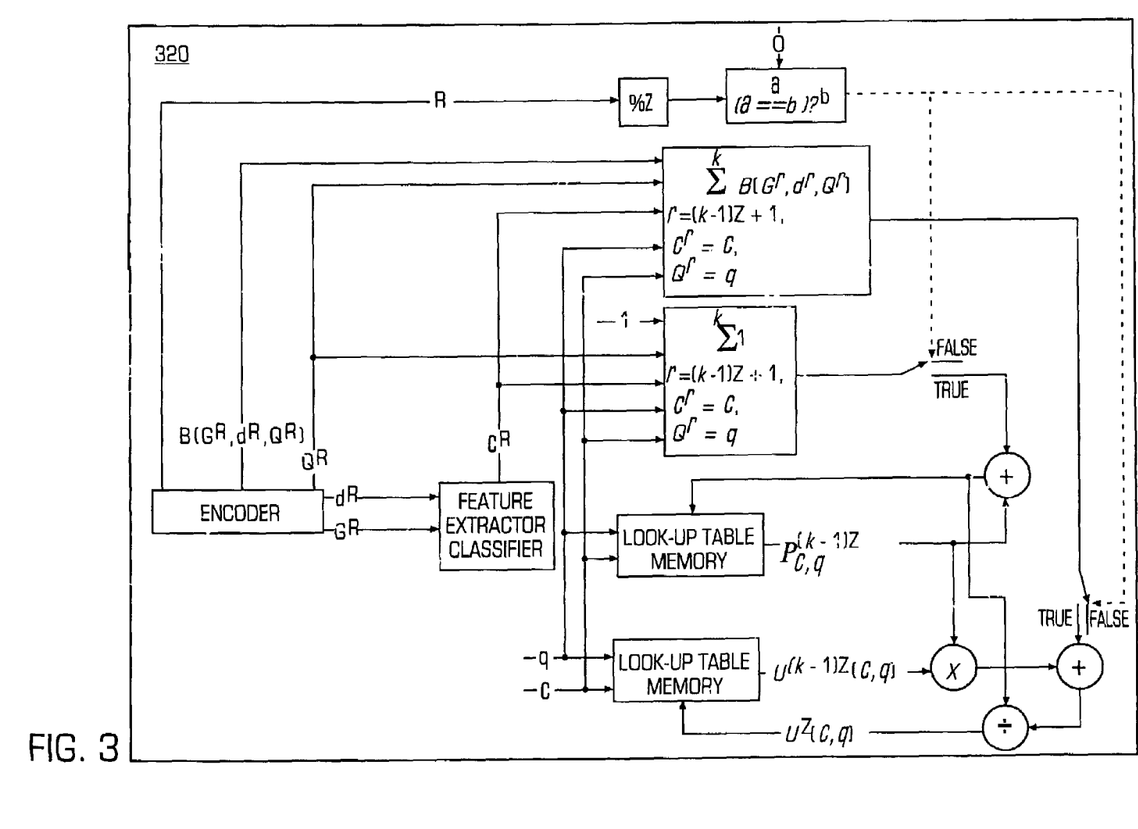
FIG. 3 is a block diagram of a circuit with a look-up table for a memory write operation during the estimator training according to an embodiment of the invention.

FIG. 3 is a detailed circuit diagram of the estimator 320 with a look-up table for a memory write operation that occurs during the Estimator module 320 training. This function of the Estimator 320 illustrates the computation of the estimated number of quantization bits for the group of macroblocks.

The number of quantization bits for the most recent macroblocks are given more weight by de-emphasizing the weight of the past values at regular intervals. This is achieved by applying the exemplary equations:

$$P_{c,q}^{kZ} = P_{c,q}^{kZ}/2 \text{ if } P_{c,q}^{kZ} > P_{c,q}^{max}$$

$$P_{c,q}^{(k-1)Z} = P_{c,q}^{(k-1)Z}/2 \text{ if } P_{c,q}^{kZ} > P_{c,q}^{max}$$

where $P_{c,q}^{max}$ is a threshold. In a preferred embodiment, the value of Z shown in FIG. 3 is set equal to the number of macroblocks in a picture. Further, it is preferred that the actual number of quantization bits observed for a particular class and the quantization parameters are used to determine the estimates for that class and quantization parameters.

Optimal Macroblock/Quantization Parameter Pairing

The present invention determines a combination of quantization parameters for the groups of blocks comprising a data entity prior to the coding of the groups of blocks so that the sum of the estimates for the number of coding bits of all the groups of blocks closely approximates the targeted number of coding bits for the data entity. This is performed by initiating an exhaustive search over the set of all possible combinations of quantization parameters.

In order to reduce the complexity of such an exhaustive search, it is preferred that the set of all possible combinations be restricted to the set of combinations for which the first, $Z_0$, of the Z macroblocks are quantized with a quantization parameter of q, and the remaining $Z-Z_0$ macroblocks are quantized with a quantization parameter of $q\pm 1$ where the sign is alternated from frame to frame. This restriction is based on the assumption that in order to achieve near optimal coding performance, the quantization parameter should not be varied greatly across a picture.

The method for obtaining the optimum pair q, $Z_0$ is described here for the case with the positive sign (i.e. $Z-Z_0$ macroblocks quantized with q+1). The search is initialized by setting the quantization parameter to the largest value allowed by the video coding standard for all macroblocks of the picture. For example, in the H.263 video compression standard, the initialization is performed as:

$$Q^R = 31 \text{ for } kZ < R \leq (k+1)Z$$

The macroblocks are scanned in the raster-scan order. That is a picture is scanned by scanning each row from left to right and scanning the row below it after it is completed. The picture scan order is repetitively applied, that is the last macroblock of the last row is followed by the first macroblock of the first row. Only the quantization parameter of the current (scanned) macroblock is decremented. The new quantization parameter and class of the current macroblock are mapped to a new bit count estimate for the current macroblock.

The bitcount estimate is overridden by an estimate of zero if the macroblock is deemed not to be coded. The decision of whether or not to code is made by comparing a feature derived from the data of the macroblock against a threshold. Preferably, this feature is taken to be the sample frame difference replenishment (temporal prediction with a zero motion vector) error variance of the luminance and chrominance values of the macroblock.

A macroblock is not coded if the inequality $$\frac{1}{384} \sum_{j \in \{1, \ldots, 6\}} \sum_{(x,y) \in g_j^R} (I^{FD}(x, y))^2 < \frac{q^2}{3}$$

is satisfied where $I^{FD}(x, y)$ is the frame difference replenishment error. Otherwise the macroblock is coded.

The estimate for the number of overhead bits, $\hat{B}_{OV}^R(q)$, for the $R^{th}$ macroblock coded with parameter q is performed as the mean, $\overline{B}_{OV}$, of the number of overhead bits of the coded macroblocks of the previously coded picture. The estimate is overridden if the macroblock is not deemed coded according to the following equation:

$$\hat{B}_{OV}^R(q) = \begin{cases} 1 & \text{if } \dfrac{1}{384} \sum_{j \in \{1, \ldots, 6\}} \sum_{(x, y) \in g_j^R} (I^{FD}(x, y))^2 < \dfrac{q^2}{3} \\ \overline{B}_{OV} & \text{else} \end{cases}$$

The search continues in the scan order described above until the sum of the estimates for the number of coding bits of all the macroblocks exceeds the targeted number $B^{TR}$ for the picture, determined according to the following equation:

$$\sum_{r \in \{kZ+1, \ldots, (k+1)Z\}} U^r(c^r, q^r) + \hat{B}_{OV}^r(q^r) > B^{TR}$$

A block diagram of the system performing the search for the combination of quantization parameters achieving the target number of bits $B^{TR}$, described above, is shown in FIG. 4. The block diagram shows how the above calculation is determined from the scan order generator 42. When the target number of bits $B^{TR}$ is reached, the signal from the comparator 40 switches OFF the search process and directs the $\{Q^R\}$ to the encoder 41.

Figure 4:
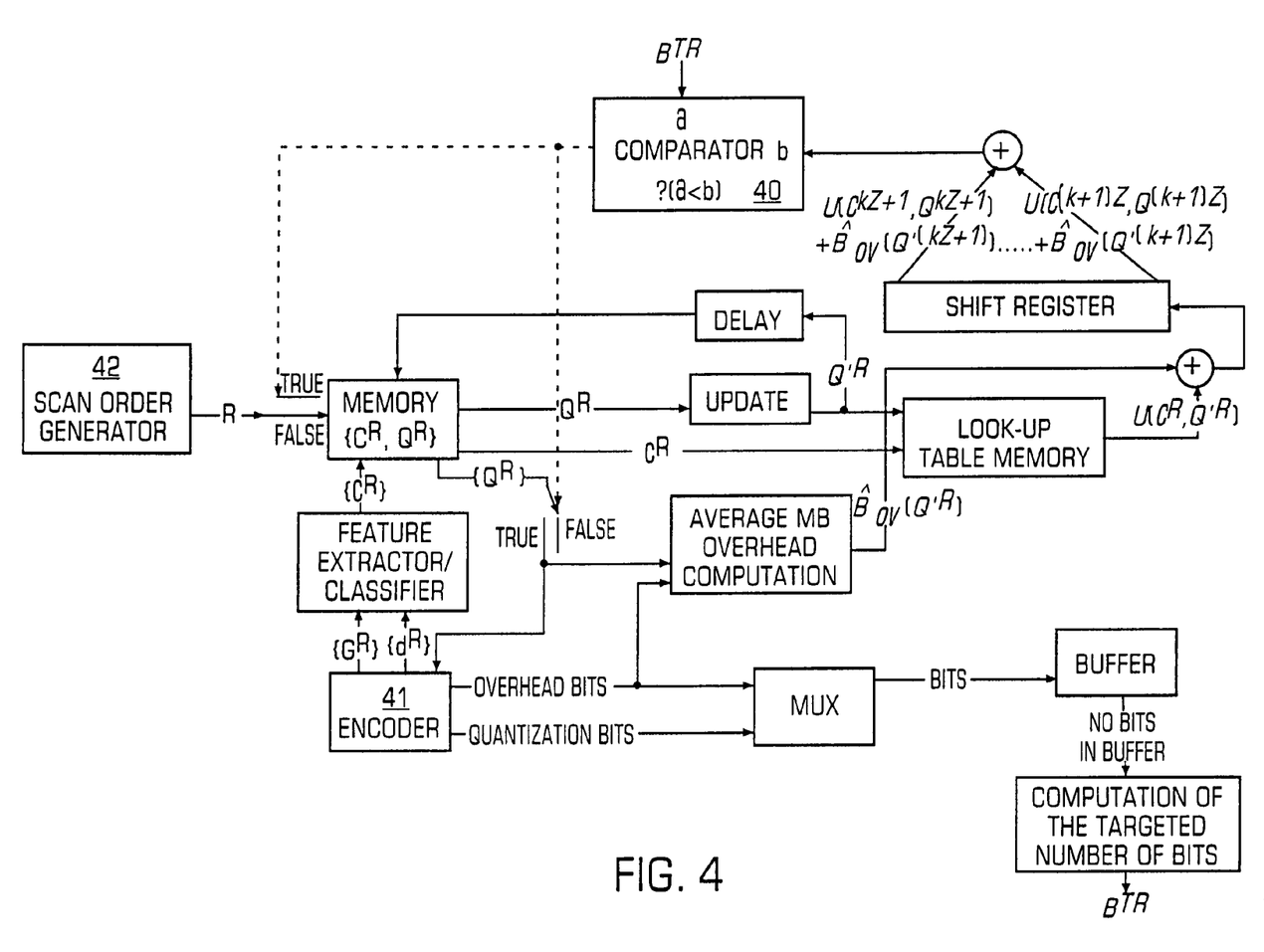
FIG. 4 is a block diagram of a circuit for the approximation of the targeted number of coding bits according to an embodiment of the invention.
Figure 5:
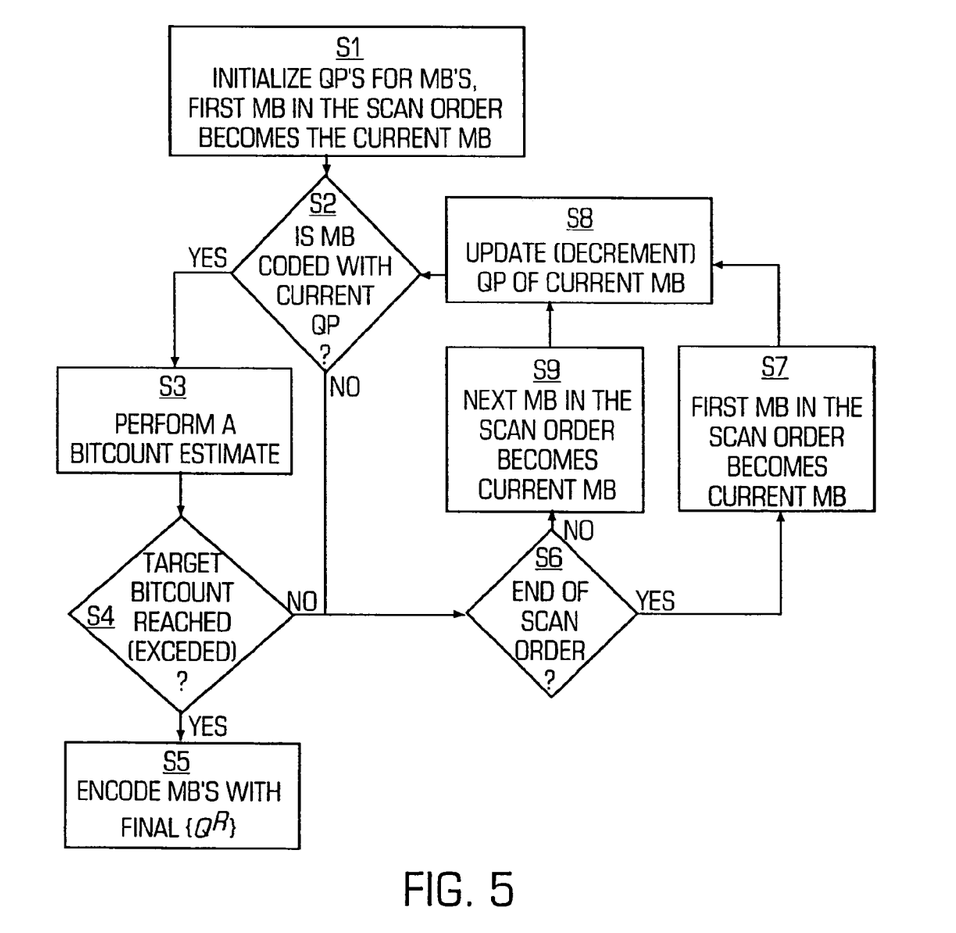
FIG. 5 is a flowchart for the approximation of the targeted number of coding bits showing the initial assignment of quantization parameters before the encoding of macroblocks and the parameter adjustment after the encoding of each macroblock.

The corresponding flowchart for the operation of the system shown in FIG. 4 is illustrated in FIG. 5. FIG. 5 shows a flowchart for the approximation of the targeted number of coding bits, $B^{TR}$, by the estimation of the number of quantization bits.

Initially, the quantization parameters are initialized for the macroblocks and the first macroblock in the scan order becomes the current macroblock (step S1).

Next a query determines whether the macroblock is coded with the current quantization parameter (step S2). If the macroblock is coded with the current quantization parameter, then a bitcount estimate is performed (step S3), and another query determines whether the targeted bitcount, $B^{TR}$, is reached or exceeded (step S4). If the targeted bitcount has been reached or exceeded, the macroblocks are encoded with the final set of quantization parameters $\{Q^R\}$ (step S5).

If the result of either the query performed in step S2 or the query performed in step S4 is NO, then an additional query determines whether the macroblock is at the end of the scan order (step S6). If the macroblock is at the end of the scan order, then the first macroblock in the scan order becomes the current macroblock (step S7) and the quantization parameter of the current macroblock is updated (decremented) (step S8). At which time the process continues with the query of step S2.

If the macroblock is not at the end of the scan order, then the next macroblock in the scan order becomes the current macroblock (step S9) and the quantization parameter of the current macroblock is updated (decremented) (step S8). At which time the process continues with the query of step S2. The system of FIG. 2 is used only in step S3. Since the quantization parameter of the current macroblock is changed, a new bitcount estimate for the current macroblock is obtained by using the system of FIG. 2. Note that during initialization (path S1->S2->S3->S4) 300, 310 and 320 may need to be performed. If the class information is stored in memory as suggested in FIG. 4, only 320 needs to be performed at a later time (path S8->S2->S3->S4).

Figure 6:
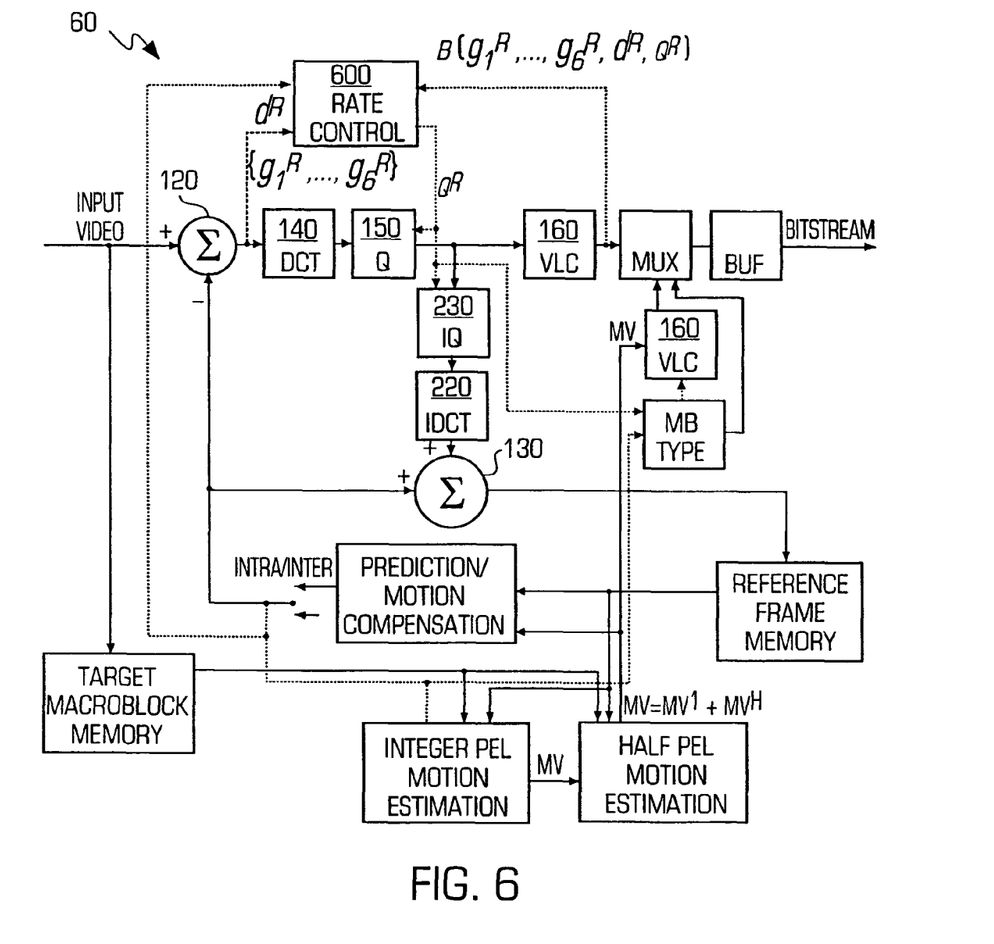
FIG. 6 is a block diagram of a video coder incorporating the rate control method according to an embodiment of the present invention.

FIG. 6 is a block diagram of a video coder 60 incorporating the rate-control method of the current invention 600. The addition of 600 is the primary difference between the video coder 60 of FIG. 6 and the video coder 100 of the prior art of FIG. 1A.

As a result of the rate control method incorporated into the video coder 60, the present invention derives a model of the relation between the number of bits used by the quantizer to quantize a group of blocks and the quantization parameter for that group given the spatial data content of the group and the coding mode. The invention uses the model to precisely estimate the number of bits that will be expended for the quantization of a future group of blocks for a chosen quantization parameter, a known spatial data content, and a known coding mode.

The rate control method of the present invention differs from that of the MPEG-4 video standard, and other similar video standards, in that the spatial data content of the group of blocks, as well as its coding mode, is factored into the estimation process by the utilization of features extracted from the data.

Unlike the rate control method of MPEG-4, or other similar standards, where the quantization parameter is mapped to the estimate for the number of coding bits with a continuous function of low degrees of freedom, the rate control method of the current invention maps each unique pair of the class of the features and the quantization parameter to a unique estimate for the number of coding bits.

In the current invention, the estimate for a particular class and quantization parameter is designed and updated by using the actual number of coding bits observed for previously coded data entities (groups of blocks) getting mapped to a certain class and quantized with a certain parameter.

In the MPEG-4 standard, or other similar standards, the parameters of the rate-distortion function of the MPEG-4 rate control method are designed and updated by using the quantization parameter and the actual number of coding bits observed for all the previously coded data entities.

The above-described embodiment is described merely as one possible realization of the design, estimation and control methods in a general framework, and is not meant to be limiting. The invention is also capable of being practiced according to additional embodiments.

What is claimed is:

1. A method for assigning quantization parameters to groups of blocks of a picture comprising the steps of:
    (a) setting the quantization parameters of all groups of blocks of the picture equal to the largest value allowed by the video coding standard;
    (b) scanning said groups of blocks according to a certain scanning order, where the last group of blocks in the scanning order is followed by the first group of blocks;
    (c) determining whether to code the next group of blocks in the said scanning order with the quantization parameter for the group of blocks;
    (d) decrementing the quantization parameter of said group of blocks;
    (e) repeating steps (b)-(d) until the sum of the estimates for the number of coding bits of all of said groups of blocks exceeds the targeted number of coding bits, $B^{TR}$, for the picture.

2. The method of claim 1, wherein the first, $Z_0$, of a number Z of groups of blocks are quantized with a quantization parameter of q, and the remaining number. $Z-Z_0$, of groups of blocks are quantized with a quantization parameter of q+1.

3. The method of claim 1, wherein a group of blocks is coded if the following inequality is satisfied:

$$\frac{1}{384} \sum_{j \in \{1, \ldots, 6\}} \sum_{(x, y) \in g_j^R} |I^{FD}(x, y)|^L \geq h(q).$$

4. The method of claim 1, wherein said repeating step is terminated according to the following equation:

$$\sum_{r\in\{kZ+1,\ldots,(k+1)Z\}} U^r(c^r, q^r) + \hat{B}^r_{OV}(q^r) > B^{TR}.$$

5. A method for assigning quantization parameters to the groups of blocks of a picture comprising the steps of:

(a) setting the quantization parameters of all groups of blocks of the picture equal to the smallest value allowed by the video coding standard;

(b) scanning said groups of blocks according to a certain scanning order, where the last group of blocks in the scanning order is followed by the first group of blocks;

(c) determining whether to code the next group of blocks in the said scanning order with the quantization parameter for the group of blocks;

(d) incrementing the quantization parameter of said group of blocks;

(e) repeating steps (b)-(d) until the sum of the estimates for the number of coding bits of all of said groups of blocks falls below the targeted number of coding bits, $B^{TR}$, for the picture.

6. The method of claim 5, wherein the first, $Z_0$, of a number Z of groups of blocks are quantized with a quantization parameter of q, and the remaining number, $Z-Z_0$, of groups of blocks are quantized with a quantization parameter of q—1.

7. The method of claim 5, wherein a group of blocks is coded if the following inequality is satisfied:

$$\frac{1}{384} \sum_{j\in\{1,\ldots,6\}} \sum_{(x,y)\in g_j^R} |I^{FD}(x,y)|^L \geq h(q).$$

8. The method of claim 5, wherein said repeating step is terminated according to the following equation:

$$\sum_{r\in\{kZ+1,\ldots,(k+1)Z\}} U^r(c^r, q^r) + \hat{B}^r_{OV}(q^r) < B^{TR}.$$

9. The method of claim 2, wherein a group of blocks is coded if the following inequality is satisfied:

$$\frac{1}{384} \sum_{j\in\{1,\ldots,6\}} \sum_{(x,y)\in g_j^R} |I^{FD}(x,y)|^L \geq h(q).$$

10. The method of claim 2, wherein said repeating step is terminated according to the following equation:

$$\sum_{r\in\{kZ+1,\ldots,(k+1)Z\}} U^r(c^r, q^r) + \hat{B}^r_{OV}(q^r) > B^{TR}.$$

11. The method of claim 3, wherein said repeating step is terminated according to the following equation:

$$\sum_{r\in\{kZ+1,\ldots,(k+1)Z\}} U^r(c^r, q^r) + \hat{B}^r_{OV}(q^r) > B^{TR}.$$

12. The method of claim 11, wherein the first, $Z_0$, of a number Z of groups of blocks are quantized with a quantization parameter of q, and the remaining number, $Z-Z_0$, of groups of blocks are quantized with a quantization parameter of q+1.

13. The method of claim 6, wherein a group of blocks is coded if the following inequality is satisfied:

$$\frac{1}{384} \sum_{j\in\{1,\ldots,6\}} \sum_{(x,y)\in g_j^R} |I^{FD}(x,y)|^L \geq h(q).$$

14. The method of claim 6, wherein said repeating step is terminated according to the following equation:

$$\sum_{r\in\{kZ+1,\ldots,(k+1)Z\}} U^r(c^r, q^r) + \hat{B}^r_{OV}(q^r) > B^{TR}.$$

15. The method of claim 7, wherein said repeating step is terminated according to the following equation:

$$\frac{1}{384} \sum_{j\in\{1,\ldots,6\}} \sum_{(x,y)\in g_j^R} |I^{FD}(x,y)|^L \geq h(q).$$

16. The method of claim 15, wherein the first, $Z_0$, of a number Z of groups of blocks are quantized with a quantization parameter of q, and the remaining number, $Z-Z_0$, of groups of blocks are quantized with a quantization parameter of q+1.

17. The method of claim 1, wherein a decision to code a group of blocks is made by comparing a feature derived from data of a macroblock against a threshold.

18. The method of claim 17, wherein the feature Is an error variance of one or both of a luminance value or a chrominanace value of the macroblock.

19. The method of claim 5, wherein a decision to code a group of blocks is made by comparing a feature derived from data of a macroblock against a threshold.

20. The method of claim 19, wherein the feature is an error variance of one or both of a luminance value or a chrominanace value of the macroblock.

* * * * *